(12) United States Patent
Begum et al.

(10) Patent No.: US 8,751,789 B2
(45) Date of Patent: Jun. 10, 2014

(54) GENERAL PURPOSE DISTRIBUTED ENCRYPTED FILE SYSTEM

(75) Inventors: Hussaina Nandyala Begum, Andhra Pradesh (IN); Shawn Patrick Mullen, Buda, TX (US); Manjunath A. Pattanshetti, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 12/884,488

(22) Filed: Sep. 17, 2010

(65) Prior Publication Data

US 2012/0072713 A1 Mar. 22, 2012

(51) Int. Cl.
| | | |
|---|---|---|
| *H04L 9/00* | (2006.01) | |
| *H04L 9/08* | (2006.01) | |
| *H04L 29/06* | (2006.01) | |

(52) U.S. Cl.
CPC ............ *H04L 9/0822* (2013.01); *H04L 9/0894* (2013.01); *H04L 63/0442* (2013.01); *H04L 2463/062* (2013.01)
USPC ........... 713/153; 713/160; 713/156; 713/189; 380/277

(58) Field of Classification Search
CPC ..................... H04L 63/0428; H04L 2209/601; H04L 9/0637; H04L 9/065; H04l 63/0823; G06F 9/48
USPC ............ 713/156, 160, 153; 380/277; 370/331
See application file for complete search history.

(56) References Cited

U.S. PATENT DOCUMENTS

| | | | |
|---|---|---|---|
| 5,931,947 A | 8/1999 | Burns et al. | |
| 6,405,315 B1 | 6/2002 | Burns et al. | |
| 6,986,043 B2 * | 1/2006 | Andrew et al. | 713/166 |
| 7,437,429 B2 | 10/2008 | Pardikar et al. | |
| 7,673,155 B2 * | 3/2010 | Hashimoto et al. | 713/194 |
| 7,792,300 B1 * | 9/2010 | Caronni | 380/277 |
| 7,917,599 B1 * | 3/2011 | Gopalan et al. | 709/216 |
| 7,937,421 B2 * | 5/2011 | Mikesell et al. | 707/825 |
| 8,150,038 B2 | 4/2012 | Perlman | |
| 8,204,890 B1 * | 6/2012 | Gogan | 707/748 |
| 8,259,934 B2 | 9/2012 | Karroumi et al. | |
| 8,358,623 B2 | 1/2013 | Samar et al. | |
| 2003/0208686 A1 * | 11/2003 | Thummalapally et al. | 713/193 |
| 2007/0124378 A1 * | 5/2007 | Elzur | 709/204 |

(Continued)

OTHER PUBLICATIONS

Final Office Action dated Aug. 27, 2013, regarding U.S. Appl. No. 13/423,184, 18 pages.

(Continued)

*Primary Examiner* — Jason K. Gee
*Assistant Examiner* — Sanchit Sarker
(74) *Attorney, Agent, or Firm* — Yee & Associates, P.C.; David A. Mims, Jr.

(57) ABSTRACT

A general purpose distributed encrypted file system generates a block key on a client machine. The client machine encrypts a file using the block key. Then, the client encrypts the block key on the first client machine with a public key of a keystore associated with a user and associates the encrypted block key with the encrypted data block as crypto metadata. The client machine caches the encrypted data block and the crypto metadata and sends the encrypted data block and the crypto metadata to a network file system server. When the client machine receives a return code from the network file system server indicating successful writes of the encrypted data block and the crypto metadata, the client machine clears the cached encrypted data block and the crypto metadata.

11 Claims, 6 Drawing Sheets

(56) References Cited

U.S. PATENT DOCUMENTS

| | | |
|---|---|---|
| 2008/0082604 A1* | 4/2008 | Mansour et al. .............. 709/203 |
| 2008/0307160 A1* | 12/2008 | Humlicek ..................... 711/113 |
| 2009/0031128 A1* | 1/2009 | French et al. ................. 713/164 |
| 2009/0106552 A1* | 4/2009 | Mohamed ..................... 713/165 |
| 2009/0110198 A1 | 4/2009 | Garimella et al. |
| 2009/0116445 A1* | 5/2009 | Samar et al. .................. 370/331 |
| 2009/0116649 A1 | 5/2009 | Perlman |
| 2009/0158035 A1* | 6/2009 | Stultz ............................ 713/160 |
| 2009/0190760 A1* | 7/2009 | Bojinov et al. ............... 380/269 |
| 2009/0240936 A1* | 9/2009 | Lambiase et al. ............ 713/156 |
| 2009/0319772 A1* | 12/2009 | Singh et al. ................... 713/153 |
| 2010/0150344 A1* | 6/2010 | Karroumi et al. ............... 380/45 |
| 2010/0161965 A1* | 6/2010 | Solin et al. .................... 713/155 |
| 2010/0199042 A1* | 8/2010 | Bates et al. .................... 711/114 |
| 2010/0250958 A1* | 9/2010 | Browning ..................... 713/189 |
| 2011/0119481 A1* | 5/2011 | Auradkar et al. ............. 713/150 |
| 2012/0185691 A1* | 7/2012 | Begum et al. ................. 713/150 |

OTHER PUBLICATIONS

Office Action dated May 10, 2013, regarding U.S. Appl. No. 13/423,184, 17 pages.

* cited by examiner

GENERAL PURPOSE DISTRIBUTED ENCRYPTED FILE SYSTEM

BACKGROUND OF THE INVENTION

1. Technical Field

The present invention relates generally to the field of encrypted file storage and more particularly to a general purpose distributed encrypted file system using centralized keystores and extended attributes.

2. Description of the Related Art

In an enterprise environment having a centralized encrypted file system (EFS, it is desirable to provide distributed access to the EFS to all clients connected to the server hosting the EFS. Generally, a distributed EFS may be implemented using either a stackable EFS or an embedded EFS.

A stackable EFS can be mounted on top of any file system to provide distributed access to the EFS across a network. Stackable EFS provides strong encryption using a cipher-block chaining (CBC) cryptographic mode. Cryptographic modes are used in conjunction with cryptographic algorithms such as AES (Advanced Encryption Standard). Cryptographic modes, referred to simply as modes from this point forward, greatly increase the overall strength of the cryptographic algorithm.

In CBC, the file is encrypted block-wise starting with an initialization vector (IV), which may be a 128-bit number. For simplification of this description, assume a 128-bit encryption key. The encryption process starts with an XOR of the IV and the encryption key. The product of the XOR is used to encrypt the first 128-bits of plane text. The IV may be a well known or agreed upon number such as zero, or to strengthen the encryption, the IV maybe a random number or the hash of the previous block. However, if the IV is not discoverable or out of sync with the encrypted data, it will not be possible to decrypt the data.

The plane-text file encrypted sequentially, 128 bits at a time. Each 128-bit block of plane-text is encrypted and then XORed with the encryption key. The product of the XOR is then used as new key to encrypt the next 128-bit of plane-text. CBC mode essentially provides each 128 bits of plain-text with its own unique encryption key. However, the decryption of any 128-bit block relies on the successful and completely accurate decryption of the previous 128-bit block. If the preceding 128-bits cannot be accurately to the bit be decrypted, then all remaining bits in the file or until the next IV reset cannot be decrypted.

Figure 3A:
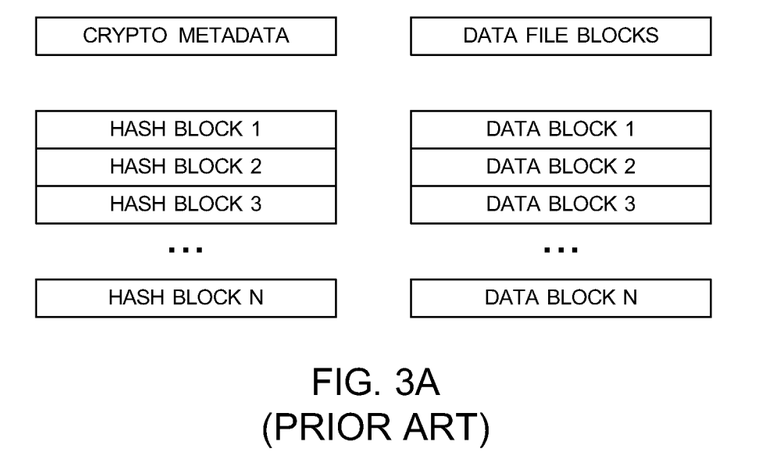
FIGS. 3A and 3B comprise a pictorial view of an embodiment of writing data blocks and crypto metadata according to the prior art.
Figure 3B:
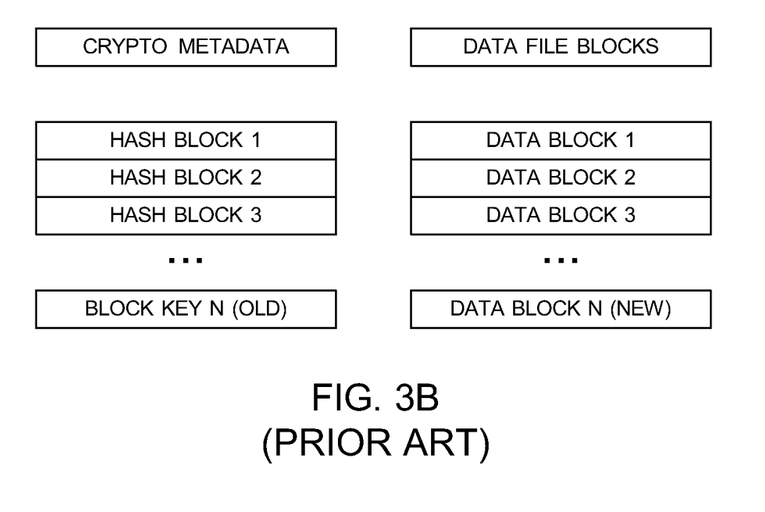

The initialization vector and encryption keys for each block of plane-text are stored as crypto metadata. As shown in FIG. 3A, each data file block is associated with crypto metadata, which may comprise a hash block. In the event of a network or server outage between the time of a data block write and its corresponding crypto metadata block write, data sitting on the disk will be lost through strong encryption and cannot be recovered. This is because the "chaining" of the cipher-block chaining will become out of sync, as illustrated in FIG. 3B, wherein an outage occurred between the writing of data block n (new) and its associated new hash block n. Not only will the particular write instance which was lost during the network or server outage be lost, but all remaining data in the file become lost through strong encryption because CBC algorithm can never be re-synchronized.

This data loss problem is particularly acute in EFS environments. For performance reasons, EFS systems will reset the IVs throughout the file. Large files are logically divided into data blocks, each with synchronized with its own IV. This means that when a file is edited and data is replaced, the entire remaining file does not need to be re-encrypted to accommodate the chaining requirements of CBC. Only the data within the logical data block up to the IV reset needs to be re-encrypted. This solves the performance problem of not having to re-encrypt the entire file, but multiples the synchronization requirement of ensuring the IV is aligned with the data block.

The data loss problem associated with stackable EFS can be avoided by using embedded EFS technology. However, embedded EFS cannot simply be mounted on any native file system. Instead, the entire file system must be modified substantially.

SUMMARY OF THE INVENTION

Embodiments of the present invention provide systems and computer program products for creating a general purpose distributed encrypted file system. A system according to the present invention generates a block key on a first client machine. The system encrypts a data block on the first client machine using the block key. Then, the system encrypts the block key on the first client machine with a public key of a keystore associated with a user and associates the encrypted block key with the encrypted file as crypto metadata. The system caches the encrypted data block and the crypto metadata on the first client machine sends the encrypted data block and the crypto metadata from the first client machine to a network file system server. When the system receives a return code from the network file system server indicating successful writes of the encrypted data block and the crypto metadata, the system clears the cached encrypted data block and the crypto metadata.

To decrypt the encrypted data block the system receives the encrypted data block and crypto metadata from the network file system server at either the first client machine or a second client machine used by the user. The system decrypts the crypto metadata using the private key of the keystore associated with the user to obtain the block key. The system then decrypts the file using the block key. The keystore associated with the user may be stored on a remote server such as a lightweight directory access protocol (LDAP) server. The crypto metadata may be associated with the encrypted data block as extended attributes.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
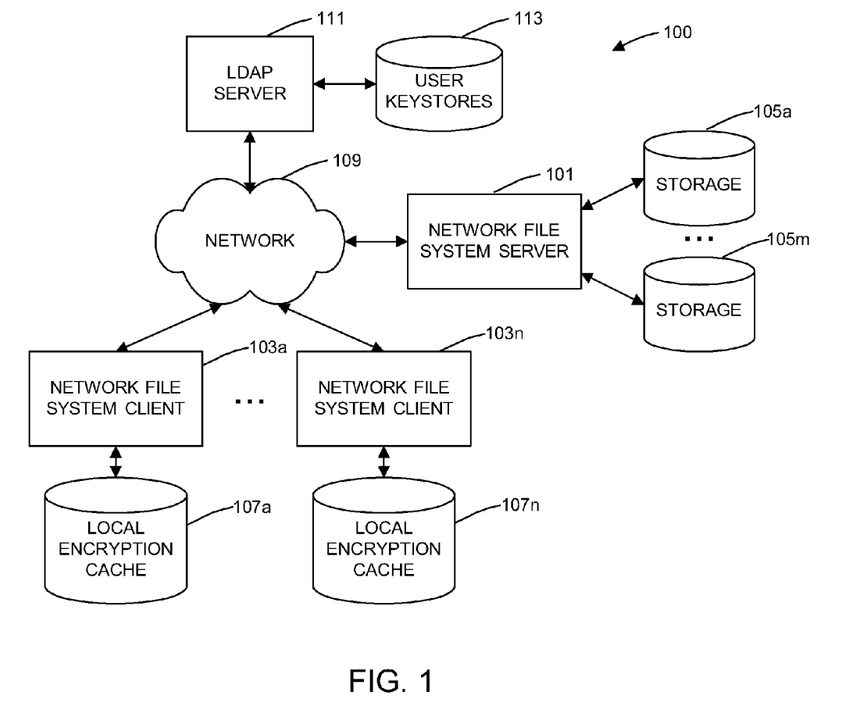
FIG. 1 is a block diagram of an embodiment of a system according to the present invention.

Referring now to drawings, and first to FIG. 1, an embodiment of a system according to the present invention is designated generally by the numeral 100. System 100 is a distributed file system and it includes a network file system server 101 and multiple network file system clients 103. Network file system server 101 and network file system clients 103 may be implemented in any suitable computing devices, examples of which will described in detail hereinafter.

Network file system server 101 includes one or more sets of physical storage media, indicated generally at 105. Network file system clients 103 each include local encryption caches 107. Local encryption caches 107 may be implemented in memory or storage associated with clients 103. As will be described in detail hereinafter, local encryption caches provide temporary storage for encrypted data blocks and crypto metadata created according to the present invention. Network file system server 101 may implement a version of the Network File System (NFS) protocol. In some embodiments, network file system server 101 implements the NFSv4 protocol.

Network file system server 101 and network file system clients are interconnected by a network, indicated generally at 109. Network 109 may be any suitable network. According to the present invention, network file system clients 103 may send to and receive from network storage system server 101 encrypted data blocks and crypto metadata that may be stored on storage media 105.

Figure 2:
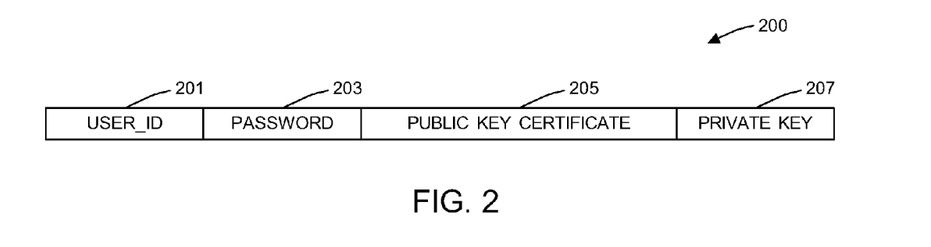
FIG. 2 is a block diagram of an embodiment of a user keystore according to the present invention.

System 100 includes a remote keystore server, which in some embodiments may be implemented in a Lightweight Directory Access Protocol (LDAP) server 111 coupled to network 109. LDAP server 111 includes a user keystores database 113. Keystores are generally well known in the art of public key cryptography. FIG. 2 illustrates a keystore 200. Keystore 200 includes a USER_ID 201 that associates keystore 200 with a particular user. Keystore 200 includes a password 203. Keystore 200 may be accessed only by the user associated with USER_ID 201 who provides password 203 to LDAP server 111. Keystore 200 includes a public key certificate 205. Public key certificate 205 includes a public key, which may be a unique 128-bit number that may be used to encrypt files. Public key certificate 205 may also include a digital signature and information about the owner of the public key. Keystore 200 finally includes a private key 207, which may be a unique 128-bit number that may be used to decrypt files encrypted with public key 205. Users of network file system clients 103 may obtain their respective keystores from LDAP server 111 for use according to the present invention.

Figure 4:
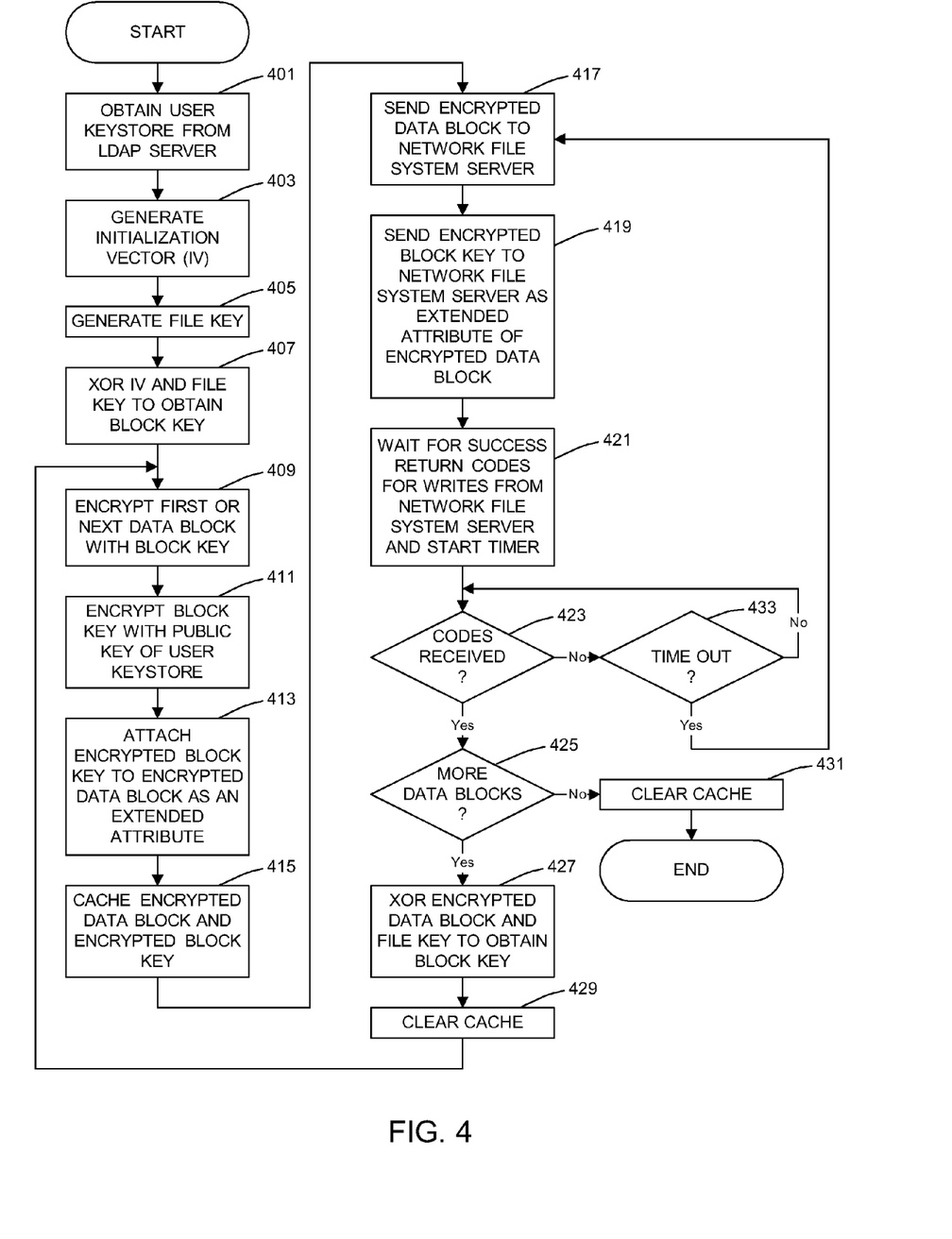
FIG. 4 is a flowchart of an embodiment of file encryption and storage according to the present invention.

FIG. 4 is a flowchart of an embodiment of file encryption and storage according to the present invention. The processing described with reference to FIG. 4 is performed on a network file system client 103. The client obtains a user keystore from the LDAP server, at block 401. The client generates an initialization vector (IV), at block 403. The IV may be a well known or agreed upon number such as zero, or to strengthen the encryption, the IV maybe a random number. The client generates a symmetric file key, at block 405. The client generates a new and unique file key every time it performs processing according to FIG. 4. The file key may be a randomly generated 128-bit number. The client then XORs the IV and the file key, at block 407, to obtain block key. The client then encrypts a first or next data block or the file to be stored using the using the block key, at block 409. A data block may be a 128-bit segment of the file to be stored. The client then encrypts the block key using the public key included in the user keystore, at block 411. The encrypted block key forms crypto metadata for the encrypted data block. In an NFSv4 implementation, the encrypted block key crypto metadata may be attached to the encrypted data block as an extended attribute, as indicated at block 413. Then, the client caches the encrypted data block and the encrypted block key crypto metadata in its local encryption cache 107, at block 415, and sends the encrypted data block and crypto metadata over network 109 to network file system server 101, as indicated at blocks 417 and 419.

The client does not commit the write of the file until it receives success return codes from the network file system server. Accordingly, the client waits for success return codes for writes a both the encrypted data block and the crypto metadata from the network file system server and starts a timer, as indicated at block 421. If, as determined at decision block 423, the client receives return codes indicating successful writes of the encrypted data block and crypto metadata, the client determines, at decision block 425, if there are more data blocks in the file to be stored. If so, the client XORs the encrypted data block with the file key to obtain a new block key, at block 427. The client clears the local encryption cache, at block 429, and processing returns to block 409. If, as determined at decision block 425, the client clears encryption cache, at block 431, and processing ends. Returning to decision block 426, if the client does not receive success codes before the timer times out, as determined at decision block 433, processing returns to block 417, whereupon the client resends the encrypted data block and crypto metadata to the network file system server. Thus, processing according to FIG. 4 continues until all of the encrypted data blocks and crypto metadata of the file are successfully stored by the network file system server.

The encrypted data block and crypto metadata are always on either the client or server. In the event of a server or network outage before the encrypted data block and its crypto metadata are successfully store on the server, the encrypted data block and its crypto metadata will not be lost or unrecoverable.

Figure 5:
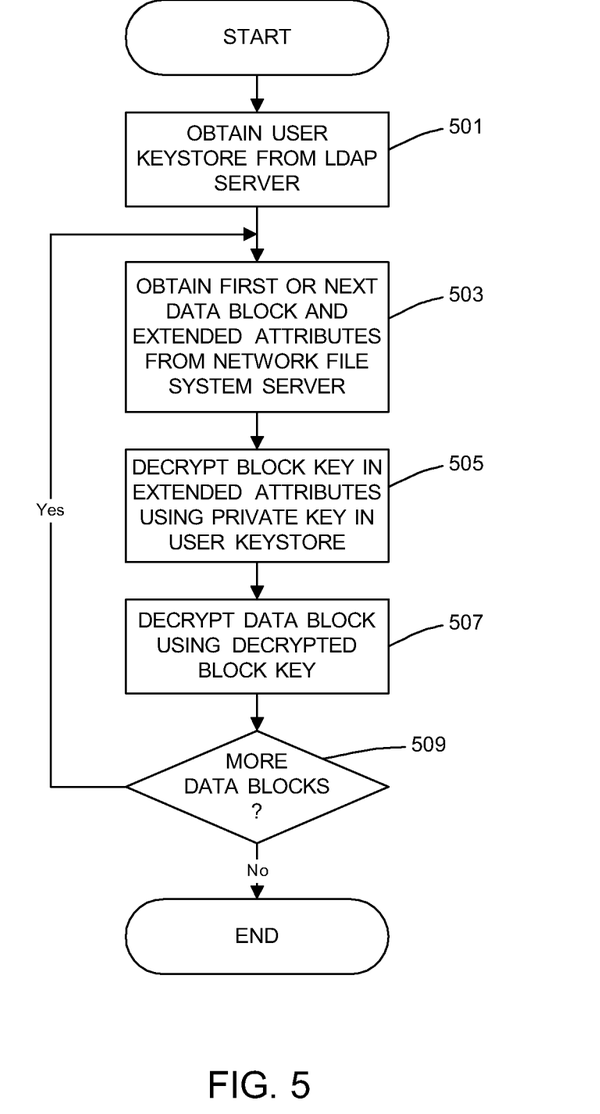
FIG. 5 is a flowchart of an embodiment of file retrieval and decryption according to the present invention.

FIG. 5 is a flowchart of an embodiment of file retrieval and decryption processing according to the present invention. The client obtains the user's keystore from the LDAP server, at block 501. The client obtains the first or next encrypted data block and extended attribute crypto metadata of the encrypted file from the network file system server, at block 503. Then, the client decrypts the encrypted block key in the extended attribute crypto metadata using the private key in the user's keystore, at block 505. The client decrypts the encrypted data lock using the decrypted block key, at block 507. Then, the client determines, at decision block 509, if there are more data blocks in the encrypted file. If so, processing returns to block 503. Processing according to FIG. 5 continues until there are no more data blocks to be decrypted.

Figure 6:
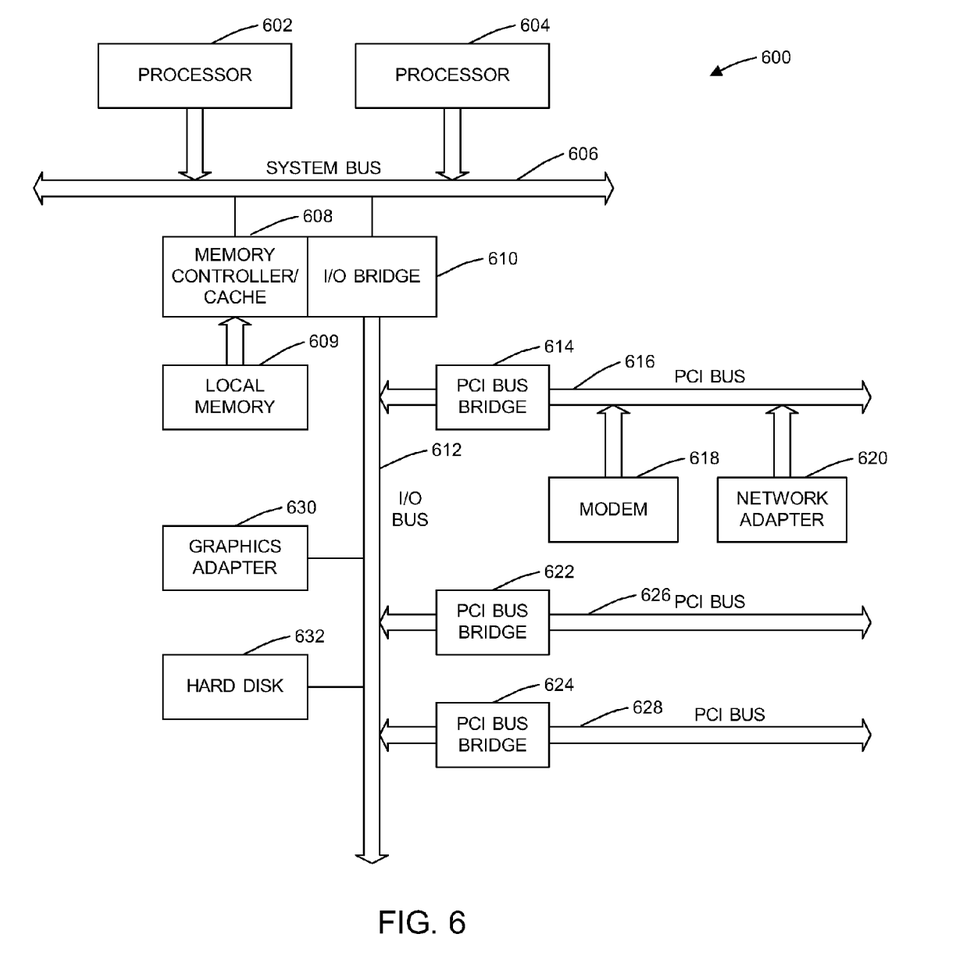
FIG. 6 is an exemplary diagram of a server computing device in which features of the present invention may be implemented; and, FIG. 7 is an exemplary block diagram client computing device in which features of the present invention may be implemented.

Referring to FIG. 6, a block diagram of a data processing system that may be implemented as a server, such as network file system server a 101 in FIG. 1, is depicted in accordance with a preferred embodiment of the present invention. Data processing system 600 may be a symmetric multiprocessor (SMP) system including a plurality of processors 602 and 604 connected to system bus 606. Alternatively, a single processor system may be employed. Also connected to system bus 606 is memory controller/cache 608, which provides an interface to local memory 609. I/O bus bridge 610 is connected to system bus 606 and provides an interface to I/O bus 612. Memory controller/cache 608 and I/O bus bridge 610 may be integrated as depicted.

Peripheral component interconnect (PCI) bus bridge 614 connected to I/O bus 612 provides an interface to PCI local bus 616. A number of modems may be connected to PCI local bus 616. Typical PCI bus implementations will support four PCI expansion slots or add-in connectors. Communications links to network 109 in FIG. 1 may be provided through modem 618 and network adapter 620 connected to PCI local bus 616 through add-in boards. Additional PCI bus bridges 622 and 624 provide interfaces for additional PCI local buses 626 and 628, respectively, from which additional modems or network adapters may be supported. In this manner, data processing system 600 allows connections to multiple network computers. A memory-mapped graphics adapter 630 and hard disk 632 may also be connected to I/O bus 612 as depicted, either directly or indirectly.

Those of ordinary skill in the art will appreciate that the hardware depicted in FIG. 6 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 6 may be, for example, an IBM eServer pSeries system, a product of International Business Machines Corporation in Armonk, N.Y., running the Advanced Interactive Executive (AIX) operating system or LINUX operating system.

Figure 7:
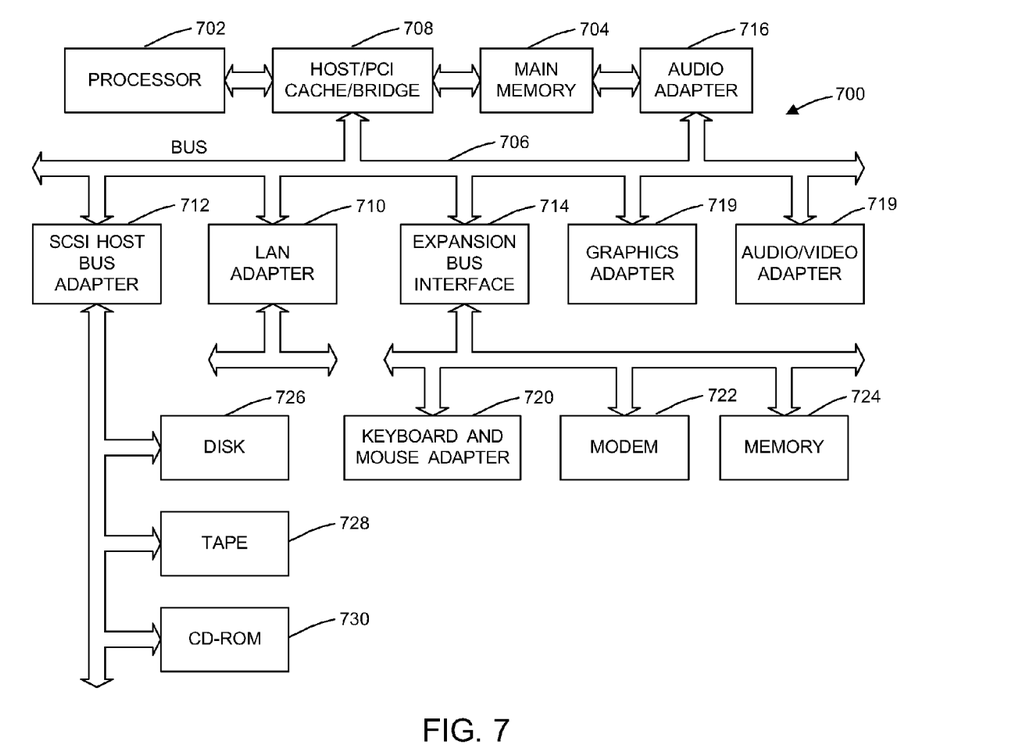

With reference now to FIG. 7, a block diagram illustrating a data processing system is depicted in which network file system client 103 of the present invention may be implemented. Data processing system 700 is an example of a client computer. Data processing system 700 employs a peripheral component interconnect (PCI) local bus architecture. Although the depicted example employs a PCI bus, other bus architectures such as Accelerated Graphics Port (AGP) and Industry Standard Architecture (ISA) may be used. Processor 702 and main memory 704 are connected to PCI local bus 706 through PCI bridge 708. PCI bridge 708 also may include an integrated memory controller and cache memory for processor 702. Additional connections to PCI local bus 706 may be made through direct component interconnection or through add-in boards. In the depicted example, local area network (LAN) adapter 710, Small computer system interface (SCSI) host bus adapter 712, and expansion bus interface 714 are connected to PCI local bus 706 by direct component connection. In contrast, audio adapter 716, graphics adapter 718, and audio/video adapter 719 are connected to PCI local bus 706 by add-in boards inserted into expansion slots. Expansion bus interface 714 provides a connection for a keyboard and mouse adapter 720, modem 722, and additional memory 724. SCSI host bus adapter 712 provides a connection for hard disk drive 726, tape drive 728, and CD-ROM drive 730. Typical PCI local bus implementations will support three or four PCI expansion slots or add-in connectors.

An operating system runs on processor 702 and is used to coordinate and provide control of various components within data processing system 700 in FIG. 7. The operating system may be a commercially available operating system, such as Windows XP, which is available from Microsoft Corporation. An object oriented programming system such as Java may run in conjunction with the operating system and provide calls to the operating system from Java programs or applications executing on data processing system 700. "Java" is a trademark of Sun Microsystems, Inc. Instructions for the operating system, the object-oriented operating system, and applications or programs are located on storage devices, such as hard disk drive 726, and may be loaded into main memory 704 for execution by processor 702.

Those of ordinary skill in the art will appreciate that the hardware in FIG. 7 may vary depending on the implementation. Other internal hardware or peripheral devices, such as flash read-only memory (ROM), equivalent nonvolatile memory, or optical disk drives and the like, may be used in addition to or in place of the hardware depicted in FIG. 7. Also, the processes of the present invention may be applied to a multiprocessor data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium or media having computer readable program code embodied thereon.

Any combination of one or more computer readable medium or media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions comprising the program code for carrying out aspects of the present invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the foregoing flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the foregoing flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A system, which comprises:
   a computer, said computer including at least one processor and memory coupled to said at least one processor, said memory storing instructions, which when executed on said at least one processor, causes said at least one processor to perform operations including:
   generating an initialization vector;
   generating a file key, wherein the file key is new and unique;
   generating a first block key by combining said initialization vector with said file key;
   encrypting a first data block with said first block key;
   encrypting said first block key with a public key associated with a user;
   associating said first encrypted block key with said encrypted first data block as crypto metadata;
   caching said encrypted first data block and said crypto metadata in a local encryption cache;
   sending said encrypted first data block and said crypto metadata to a network file system server wherein said cached encrypted data block and said crypto metadata remain on one of a client or said network file system server until receipt of a return code indicating successful writes of said encrypted first data block and said crypto metadata by said network file system server; and,
   generating a second block key by combining said encrypted first data block with said file key and clearing said cached encrypted data block and said crypto metadata upon receipt of the return code indicating successful writes of said encrypted first data block and said crypto metadata by said network file system server.

2. The system as claimed in claim 1, wherein said public key is part of a keystore associated with said user.

3. The system as claimed in claim 2, wherein said keystore is stored on a remote server.

4. The system as claimed in claim 3, wherein said remote server comprises a lightweight directory access protocol (LDAP) server.

5. The system as claimed in claim 1, wherein said crypto metadata is associated with said encrypted first data block as extended attributes.

6. The system as claimed in claim 1, wherein said memory further stores instructions, which when executed on said at least one processor, causes said at least one processor to perform operations including:
   receiving said encrypted first data block and said crypto metadata from said network file system server;
   decrypting said crypto metadata using a private key to obtain said first block key; and,
   decrypting said encrypted first data block with said first block key.

7. The system as claimed in claim 6, wherein said private key is part of a keystore associated with said user.

8. The system as claimed in claim 7, wherein said keystore is stored on a remote server.

9. The system as claimed in claim 8, wherein said remote server comprises a lightweight directory access protocol (LDAP) server.

10. A computer program product having instructions stored in a computer readable storage device, for execution by a computer, said computer program product comprising:
   instructions stored in said computer readable storage device for generating an initialization vector;
   instructions stored in said computer readable storage device for generating a file key, wherein the file key is new and unique;
   instructions stored in said computer readable storage device for generating a first block key by combining said initialization vector with said file key;
   instructions stored in said computer readable storage device for encrypting a first data block with said first block key;
   instructions stored in said computer readable storage device for encrypting said first block key with a public key associated with a user;
   instructions stored in said computer readable storage device for associating said encrypted first block key with said encrypted first data block as crypto metadata;
   instructions stored in said computer readable storage device for caching said encrypted first data block and said crypto metadata in a local encryption cache;
   instructions stored in said computer readable storage device for sending said encrypted first data block and said crypto metadata to a network file system server wherein said cached encrypted data block and said crypto metadata remain on one of a client or said network file system server until receipt of a return code indicating successful writes of said encrypted first data block and said crypto metadata by said network file system server; and,
   instructions stored in said computer readable storage device for generating a second block key by combining said encrypted first data block with said file key and clearing said cached encrypted first data block and said crypto metadata upon receipt of the return code indicating successful writes of said encrypted first data block and said crypto metadata by said network file system server.

11. The computer program product as claimed in claim 10, further comprising:
   instructions stored in said computer readable storage device for receiving said encrypted first data block and said crypto metadata from said network file system server;
   instructions stored in said computer readable storage device for decrypting said crypto metadata using a private key to obtain said first block key; and,
   instructions stored in said computer readable storage device for decrypting said encrypted first data block with said first block key.

\* \* \* \* \*